MAGNETIC MEMORY CHANNEL RECIRCULATING SYSTEMS

Filed July 27, 1953 2 Sheets-Sheet 1

INVENTORS
FLOYD G. STEELE
BY Hugh L. Willis Jr.

Dec. 3, 1957 F. G. STEELE 2,815,498

MAGNETIC MEMORY CHANNEL RECIRCULATING SYSTEMS

Filed July 27, 1953 2 Sheets-Sheet 2

INVENTOR.
FLOYD G. STEELE

BY Hugh L. Mills Jr.

United States Patent Office 2,815,498

Patented Dec. 3, 1957

2,815,498

MAGNETIC MEMORY CHANNEL RECIRCULATING SYSTEMS

Floyd G. Steele, La Jolla, Calif., assignor to Digital Control Systems, Inc., La Jolla, Calif., a corporation of California Application July 27, 1953, Serial No. 370,410

12 Claims. (Cl. 340—174)

The present invention relates to magnetic memory channel recirculating systems, and, more particularly, to memory recirculating systems having a greatly reduced number of electronic components.

Magnetic memory storage systems of present day binary computers generally employ the so-called non-return-to-zero recording technique in which adjacent one valued digits are given the same continuous magnetic bias direction without indicating on the memory channel the break between the two by, for example, a reversal of the bias direction. In the subsequent conversion of such a magnetic pattern into an electrical signal form for use by the computer, an associated timing signal track on the drum provides a timing signal which serves, within the computer, to distinguish between the consecutive one binary values in the converted electrical signal.

In sensing or reading a non-return-to-zero pattern, a transducer head generally having an effective single winding thereon is placed adjacent the channel and produces alternate positive and negative pulses as the two bias direction changes pass beneath its pole faces. Then, these alternate positive and negative pulses are amplified and passed through an inverter stage, requiring at least a single tube envelope, such that the original pulses are retained in their amplified form and another simultaneous stream of pulses complementary thereto are generated. In the process of inverting the pulse stream, no significant amplification thereof is obtained, the only purpose of the tube being to produce pulse information complementary to that initially sensed by the head.

After the inverting operation, all positive pulses in both streams may be clipped off and the resulting two negative pulse streams fed directly into the two input terminals, respectively, of a first or unsynchronized flipflop stage and resulting sequence of voltage levels produced thereby representing the binary bias pattern originally passing beneath the "read" head. However, before the electrical output signals produced by this flip-flop are usable by the computer, they must be first synchronized with the timing signal and this, in turn, is accomplished by applying the complementary output signals of the flip-flop into two "and" gating circuits, respectively, the timing signal being likewise fed into each circuit. The output signals of these two "and" circuits are, in turn, applied to the two input terminals of a second or synchronizing flip-flop stage with the consecutive output signals of the unsynchronized flip-flop being transferred by the timing signal into this second flip-flop to thus appear synchronously with the timing signal and hence be in a usable form for the associated computer device.

The memory recirculating systems of the present invention effectively accomplishes the same result as noted above for conventional systems while at the same time omitting two of its major components, namely, the inverter stage and the unsynchronized flip-flop. The first omission is obtained by placing two oppositely wound coils on the transducer head such that complementary pulse streams are immediately produced by the flux pattern passing beneath its pole faces, with the pair of pulse streams being separately amplified, in turn, by a pair of amplifier channels, respectively.

Finally, the negative signals in each stream are eliminated by a diode therein to yield a pair of positive pulse streams similar to those produced at the output of the inverter stage in conventional systems.

The unsynchronized flip-flop found within conventional memory circuitry is eliminated in the present invention in two different ways depending primarily on the wave shape of the pulses produced at the "read" head. The first system is preferably utilized when the parameters of recording are such as to give relatively sharp pulses at the "read" head, owing, for example, to high resolution recording and sensing, low pulse packing, slow memory speeds, etc. Here, the relatively sharp positive pulses produced in each amplifier channel are applied directly through diodes to the two input capacitors of the first computer flip-flop, corresponding to the second flip-flop noted above in conventional systems, with the result that each appearing positive pulse serves to fully charge its respective input or triggering capacitor. Then, with the timing signal applied through diodes to the same plate of these capacitors as are the positive pulse streams, the timing signal will act to discharge either capacitor, if charged, upon its fall to its low voltage level during each timing interval. Each capacitor discharge, in turn, produces a negative pulse across its associated flip-flop's triode grid which causes the flip-flop to be triggered.

The second memory recirculation system according to the present invention is primarily useful when the pulses produced at the "read" head are of a relatively spread or broad configuration owing, for example, to relatively poor resolution in the recording, high pulse packing, high memory speeds, etc. In this case, each of the two positive pulse streams is applied to one input terminal of an associated "and" gating circuit, the timing circuit being applied to the other input terminal thereof. The output terminals of the two "and" circuits are, in turn, coupled to the two triggering capacitors, respectively, of the first computer flip-flop. Each positive pulse in each stream acts to charge up its associated flip-flop capacitor through its "and" circuit with the next following low voltage level in the clocking signal serving, as is usual in the operation of such gating circuits, to discharge the capacitor and consequently trigger the flip-flop.

It is, therefore, the principal object of the present invention to provide magnetic memory drum recirculating systems for recirculating binary information on a memory channel in the non-return-to-zero system having greatly reduced circuit complexity.

Another object of the present invention is to provide devices for recirculating binary information on a rotatable magnetic memory drum without utilizing inverter stages or unsynchronized flip-flops.

A further object of the present invention is to provide recirculating systems for use with a rotatable magnetic memory drum wherein changes of magnetic bias direction are sensed as a pair of complementary pulse streams and subsequently converted, without the employment of an inverter stage, into an equivalent electrical signal form.

A still further object of the present invention is to provide systems for recirculating binary information on an information channel of a rotatable magnetic memory drum wherein each change of bias direction is converted into a corresponding electrical signal having a synchronous relationship with an associated timing signal without the use of a synchronizing flip-flop stage.

Still another object of the present invention is to provide memory recirculating systems each of which produces complementary pulse streams at the transducer head upon a series of magnetic bias direction changes, separately amplifies the pair of pulse streams, eliminates the negative pulses from each of the streams, and uses the resulting positive pulses in synchronization with a timing signal for directly triggering the memory flip-flop of an associated digital computer system.

A further object of the present invention is to provide a device for converting relatively sharp pulses, produced in a pair of complementary pulse streams by scanning a binary information channel, into an equivalent electrical signal form by applying the positive amplified pulses in the pair of pulse streams to a pair of flip-flop triggering capacitors, respectively, and discharging either capacitor, if charged, by an associated timing signal.

A still further object of the present invention is to provide a memory recirculating system for use with relatively sharp pulses produced in a pair of complementary pulse streams by a "read" head from a passing binary information channel, the system serving to separately amplify the pair of pulse streams, eliminating the negative pulses from each, applying the resulting positive pulses in the two streams through diodes to the triggering capacitors, respectively, of an associated flip-flop to directly charge the capacitors, and applying a timing signal through diodes to the triggering capacitors to discharge either capacitor if charged and consequently trigger the flip-flop.

Still another object of the present invention is to provide a device for converting relatively broad pulses produced in a pair of complementary pulse streams by scanning the magnetic pattern on a binary information channel into an equivalent electrical form by applying the positive amplified pulses in each of the streams to a pair of "and" gating circuits connected, in turn, to the pair of input terminals, respectively, of a flip-flop, and applying an associated timing signal to each of the "and" circuits.

Other objects and features of the present invention will be readily apparent to those skilled in the art from the following specification and appended drawings wherein is illustrated a preferred form of the invention, and in which.

Figure 1:
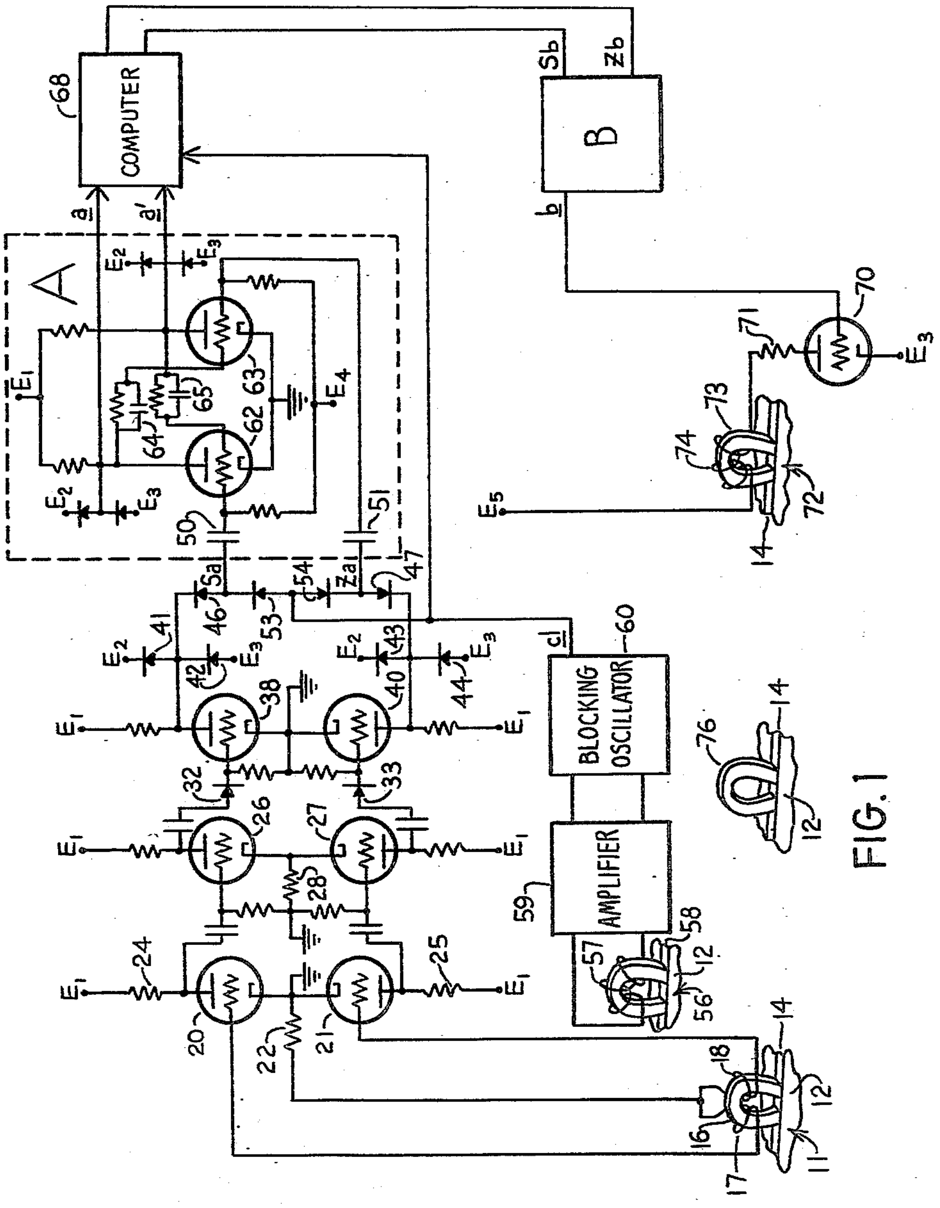
Figure 1 is an electrical circuit diagram of one memory recirculating system according to the present invention.

Referring now to Figure 1, for the memory system especially suitable for use with relatively sharp pulses produced at the "read" head, there is schematically illustrated in the left hand portion thereof, a transducer head 11, here used for "read" purposes, adjacent the magnetizable material 12 comprising, in turn, the outer surface of a rotatable magnetic memory drum, not here specifically illustrated. Particularly, head 11 comprises a C-shaped ferrite core 16 having a pair of windings 17 and 18 thereon, the two being wound in opposite directions. The narrow air gap between the lower faces of core 16 is positioned perpendicularly to the direction of travel of a circumferential information track or channel 14 magnetically recorded, as will be later described, by a "write" or record head, channel 14 differing only from magnetizable surface 12 by its information bearing magnetic pattern.

One end of winding 17 is connected to the grid of a triode 20, the corresponding end of winding 18 being coupled to the grid of a triode 21. The other ends of windings 17 and 18 are mutually joined and from their common junction point are connected through a small valued resistor 22 to the grounded cathodes of triodes 20 and 21. The anodes of triodes 20 and 21 are connected through conventional anode resistors 24 and 25, respectively, to the terminal $E_1$ of a source of positive potential, not here illustrated, which may be, for example, on the order of +45 volts.

The anodes of triodes 20 and 21 are capacitively coupled in a conventional manner to the grids of another pair of triodes 26 and 27, respectively, whose anodes, in turn, are separately coupled through appropriate plate resistors to the $E_1$ terminal. Also, the cathodes are mutually joined and, from the point of their junction, are connected to ground through a cathode resistor 28. Additionally, the grids of triodes 26 and 27 are connected to ground through conventional grid resistors.

The anodes of triodes 26 and 27 are capacitively coupled to the cathodes of crystal diodes 32 and 33, respectively, whose anodes, in turn, are connected directly to the grids of yet another pair of triodes 38 and 40, respectively. It should be pointed out that diodes 32 and 33, as shown in Fig. 1, and of all other diodes to be described hereinafter are illustrated as poled with respect to the direction of electron flow. The grids of triodes 38 and 40 are furnished with the conventional grid resistors while their respective cathodes are coupled to ground. Also, the anodes of triodes 38 and 40 are coupled through separate plate resistors to the terminal $E_1$.

A clamping potential, appearing at the terminal $E_2$ of a source of positive potential, not here shown, it being, for example, on the order of 22½ volts, is applied to the anode of triode 38 through the anode to cathode of a diode 41. In the same way, another clamping potential appearing at the terminal $E_3$ of another source of potential, not here illustrated, it being, for example, on the order of 28½ volts, is applied to the cathode of a diode 42 and from the anode thereof to the anode of triode 38. In the same way, the $E_2$ and $E_3$ terminal potentials are applied through diodes 43 and 44, respectively, to the anode of triode 40.

The clamped output signal of triode 38 is applied through a unidirectional electron flow device, such as diode 46 to one plate of a triggering capacitor 50 in an electronic switching device, such as flip flop A, while the corresponding anode clamped output signal of triode 40 is applied through a diode 47 to one plate of another triggering capacitor 51, also in flip flop A. A timing signal *cl* is also applied through diodes 53 and 54 to the one plate of capacitors 50 and 51, respectively, signal *cl* being originally produced by a timing read head 56, having a single winding 57 thereon, sensing a timing signal permanently recorded on a timing track 58, also on magnetizable coating 12. The two ends of winding 57 are, in turn, coupled to an amplifier 59, the output signal of which is applied to a conventional blocking oscillator 60 whose output signal comprises signal *cl*.

Considering now flip-flop A, the other plate of capacitor 50 is coupled to the grid of a first triode 62 while the other plate of capacitor 51 is coupled to the grid of a second triode 53. The cathodes of triodes 62 and 63 are both coupled to ground while their grids are coupled through conventional grid resistors to the terminal $E_4$ of a source of negative potential, not here illustrated, it being, for example, −45 volts. The anodes of triodes 62 and 63 are coupled through conventional plate resistors to the $E_1$ terminal with the anode of triode 62 being additionally coupled to the grid of triode 63 through a paralleled resistor-capacitor combination 64. In the same way, the anode of triode 63 is coupled to the grid of triode 62 through a paralleled resistor-capacitor combination 65 while both of the triode anodes are clamped at the respective $E_2$ and $E_3$ terminal potentials through diodes connected thereto in the way shown for the anode connections of triodes 38 and 40. An output signal *a* from flip-flop A is derived from the anode of triode 62 while the complementary output signal *a'* is taken from the anode of triode 63. For consistency in nomenclature, the input terminal to flip-flop A coupled to triggering capacitor 50 is designated $S_a$ while that coupled to triggering capacitor 51 is designate $Z_a$, the meanings of which will become more evident later.

Signals *a* and *a'* along with timing signal *cl* are applied to an associated computer 68 for further use thereby. Computer 68 may be the computing section of a general purpose type of computer, a digital differential analyzer type computer, etc. which require cyclical memory devices and employ flip-flop output signals in performing their computational operations. One such computer embodiment may be found in a co-pending U. S. application for patent entitled "Computer Read-Out System," Serial No. 330,429, filed January 9, 1953, by Floyd G. Steele.

Triggering signals issuing from computer 68 and, more particularly, from the diode gating circuitry therein are applied to the $S_b$ and $Z_b$ input terminals of a record or "write" flip-flop B which may be structurally similar to flip-flop A. The output signal *b* of flip-flop B is applied to the grid of a recording triode 70, the cathode thereof being coupled to the $E_3$ terminal. The anode of triode 70 is coupled serially through a small anode resistor 71 and the winding 74 of a "write" or record head, generally designated 72. Head 72 is of the same general configuration as are heads 11 and 56, it containing a C-shaped ferrite iron core 73, with the narrow air gap between the pole faces thereof being positioned perpendicularly to the direction of travel of the previously mentioned information channel 14. The other end of winding 74 is, in turn, coupled to the terminal $E_5$ of a source of positive potential of, for example, 135 volts.

Finally, to the left of "write" head 72, as viewed from Figure 1, is illustrated a permanent erase magnet 76, the air gap between its pole faces being aligned perpendicularly to the direction of travel of channel 14. It is positioned relative to the "read" and "write" heads such that all information previously written by the "write" head will be first sensed by the "read" head and then erased, the meaning of erasure becoming more evident later.

In considering the operation of the circuit of Figure 1, it is considered most appropriate to begin with the information recording process before proceeding to the recirculation thereof through the "read" circuitry. Accordingly, considering flip-flop B for the moment, it may be stated that computer 68 will deliver triggering signals to the $S_b$ and $Z_b$ input terminals thereof, with the resulting conduction states of flip-flop B, as represented by the voltage levels appearing in its output signal *b*, representing binary data to be stored magnetically on channel 14. Although the detailed operation of flip-flop A will be later set forth, it may here be stated that flip-flop B, upon each receipt of a triggering signal on its $S_b$ input conductor will be triggered such that its output signal *b* will rise to its high or 28½ voltage level representing, in turn, a binary value of one.

On the other hand, flip-flop B will be triggered in response to each signal applied to its $Z_b$ terminal, such that its output signal *b* will go to its low or 22½ level and hence represent a binary value of zero.

It should be noted that flip-flop B is triggered simultaneously by computer 68 in accordance with timing signal *cl* such that signal *b* changes from one to its other output voltage level precisely in accordance with signal *cl*, the result being that the magnetic pattern eventually produced on channel 14 bears a predetermined physical relationship with the timing megnetic pattern permanently recorded on timing track 58.

Now, erase magnet 76 continuously applies a magnetic bias to channel 14 in a direction parallel to its movement to represent magnetically, as defined, a continuous stream of zero binary values. Thus, when signal *b* is low to represent a zero value, triode 70 is substantially at cut-off owing to its cathode being at the 28½ volt potential of terminal $E_3$, or 6 volts below the signal *b* potential on its grid. Thus, only a relatively small current will flow through winding 74 of head 72 with the result that the erase or zero value direction of magnetic bias will pass head 72 substantially unchanged. On the other hand, when signal *b* is high or at its 28½ volt level representing a binary value of one, both the grid and cathode of triode 70 will be at the same potential and full current flow through winding 74 thereby produced. Now, by having the direction of the winding of coil 74 such that current flow therethrough acts to reverse the direction of the zero value bias, this full current through triode 70 serves to reverse the normally applied erase magnet's direction of bias to thereby represent magnetically recorded binary one values.

Figure 2:
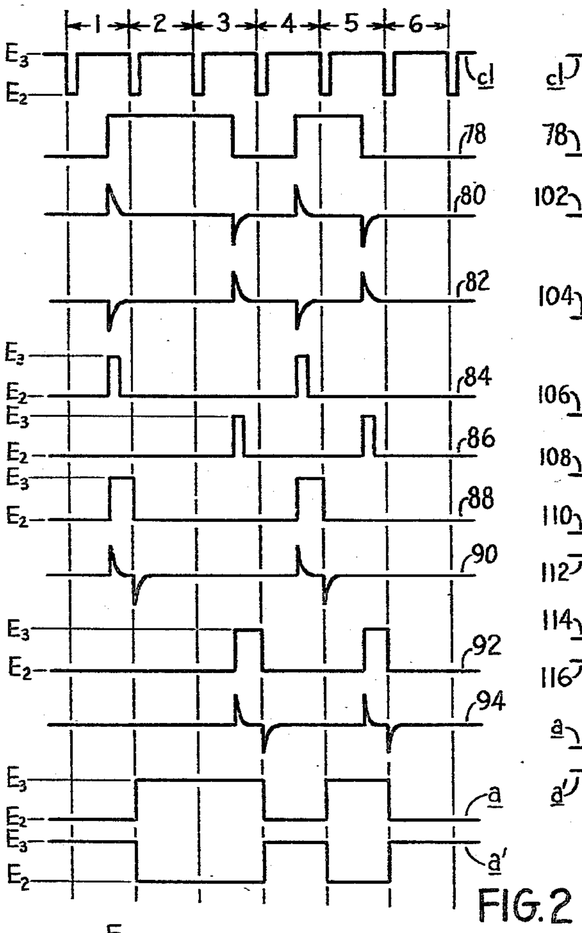
Figure 2 is a group of signal waveforms appearing at various points in the circuit of Figure 1.

Considering now the further operation of the present recirculating system, reference is made to Figure 2 wherein is set forth a group of signal waveforms more fully illustrating its mode of functioning. First illustrated in Figure 2 is the timing signal *cl* as produced by blocking oscillator 60, signal *cl* marking a series of consecutive timing intervals. Each timing interval, in turn, comprises a first narrow portion of a low or 22½ volt potential level corresponding to the regeneration period in the oscillator's operation, with the remaining portion of each interval comprising a high or 28½ volt level representing the quiescent state of the oscillator between the periods it receives triggering signals from amplifier 59, as originally taken from track 58.

Next illustrated in Figure 2 is a schematic representation of a few binary digits, here taken by way of example only, magnetically recorded on channel 14 and designated by the waveform pattern 78. Now, read head 11 is positioned relative to the timing signal magnetic pattern such that any changes in flux direction, as originally produced by head 74, representing changes in recorded binary digit values, passes beneath its gap intermediate the high voltage level portion of a signal *cl* timing interval. Thus, as shown, during the first interval, pattern 78 changes its bias direction from a zero to a one binary representation while, during the third interval, switches from a binary one to a binary zero representation, etc.

As stated previously, windings 17 and 18 are wound in opposite directions with the changes in flux direction on channel 14 accordingly producing opposite polarity pulses on their coil ends going to triodes 20 and 21. This is shown by the two waveforms, generally designated 80 and 82 in Figure 2 as they appear at the grids of triodes 20 and 21, respectively.

Considering now the series of triodes 20, 26 and 38 and their associated circuitry to form one amplifying channel, the alternate positive and negative pulses in signal 80 will be amplified by triode 20 circuit to form alternate negative and positive pulses, respectively, at its anode. These resulting alternate negative and positive pulses, in turn, will be amplified by the triode 26 circuit to form alternate positive and negative pulses, respectively, at its anode with only the resulting negative pulses being passed by diode 32 to the grid of tridoe 38. These negative pulses, in turn, as were originally derived from the positive pulses of signal 80, will be amplified by triode 38 to produce positive pulses at its anode, as are illustrated in the clamped anode signal, generally designated 84 in Figure 2.

The other amplifier channel, comprising triodes 21, 27 and 40 and associated circuitry responds similarly to the previously noted channel and the positive pulses in signal 82, as originally applied to the grid of triode 21, appear as clamped positive signals on the anode of triode 40, as are illustrated in the signal waveform generally designated 86 in Figure 2.

Considering now the effect of signal 84 on flip-flop A, each positive pulse therein will be conducted through diode 46 to charge capacitor 50 to its same high voltage level with the signal waveform, generally designated 88 in Figure 2 illustrating the voltage across capacitor 50. Thus, the high voltage level pulse appearing during the first and fourth intervals in signal 84 produce corresponding charges across capacitor 50, the charge thereof during the remaining portion of its respective timing interval being only slightly dissipated through the back resistance of diode 46.

Now, if it is assumed that triode 62 in flip-flop A is fully conducting at the beginning of the first timing interval with output signal *a* accordingly being at its clamped low voltage level, then, upon the sudden fall of signal *cl* at the end of the first timing interval, capacitor 50 will be suddenly discharged through the triode 62 grid resistor with a resulting negative pulse appearing at the grid thereof. This negative pulse is illustrated in the signal waveform 90 of Figure 2 at the beginning of the second timing interval and it, in turn, will cause the conduction then taking place through triode 62 to be suddenly reduced. This reduced conduction and anode current flow, in turn, causes a corresponding rise of hte triode 62 and anode potential which is coupled through the parallel resistor-capacitor combination 64 to the grid of the then cut off triode 63. This rise of grid potential, in turn, causes conduction to begin to take place through triode 63, its resulting decrease in plate potential being coupled back through combination 65 to the grid of triode 62 to decrease still further its grid potential. This interaction between the two triode circuits continues in an almost instantaneous manner until both of their original conduction states are reversed with triode 62 being at cut off and triode 63 being in full conduction.

It is to be noted that the positive pulse in signal 90 occurring at the instant capacitor 50 received its charge from the positive pulse in signal 84 during this first timing interval will be ineffective to change the already fully conducting status of triode 62.

The change in the conduction state of flip-flop A is readily apparent in the signal *a* waveform in Figure 2 wherein it rises from its low or $E_2$ potential during the first timing interval to the high or $E_3$ potential at the beginning of the second interval. In the same way, the output complimentary signal *a'*, as it appears on the anode of triode 63, was initially high during the first interval owing to the non-conducting status of its triode and, during the second interval, will be low owing to the fully conducting state of triode 63.

The circuitry coupled to triggering capacitor 51 operates similarly to that described previously in connection with capacitor 50 and, during the third timing interval when the next change of magnetic bias direction takes place, the high voltage level appearing in signal 86 on the anode of triode 40 serves to charge capacitor 51, the potential across which is represented by the signal waveform 92, also included in Figure 2. At the end of this third interval, the triggering of blocking oscillator 60 and subsequent low level in signal *cl* serves to discharge capacitor 51 with a resulting negative pulse appearing across the grid resistor of triode 63, as illustrated in the grid signal waveform generally designated 94. This negative pulse will act in the manner previously described to reverse the conduction state of flip-flop A at the beginning of the next or fourth interval with the result that signals *a* and *a'* go to their low and high voltage levels, respectively.

In the same way, the conversion of the remaining magnetically recorded digit values in pattern 78 into an electrical signal form may be readily understood.

Figure 3:
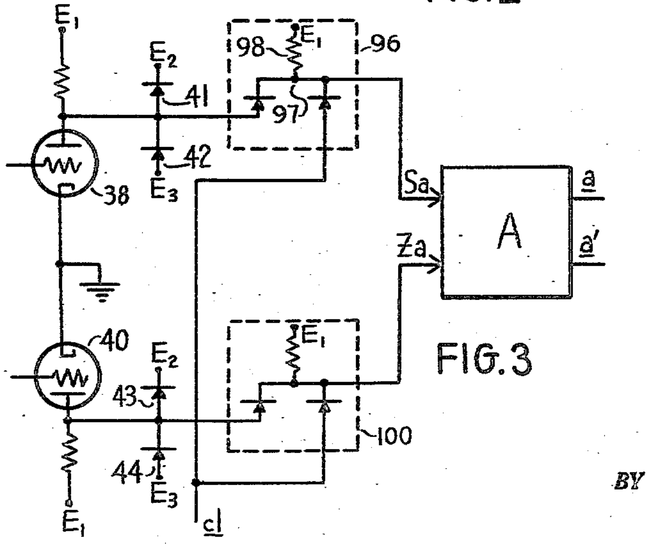
Figure 3 is an electrical circuit diagram of another form of flip-flop triggering circuit for use in the circuit of Figure 1.

Referring now to Figure 3, there is illustrated another embodiment of a triggering circuit which may be employed in the circuit of Figure 1 to trigger flip-flop A from the complementary pulse streams produced by the first and second amplifier channels. In particular, this embodiment has particular utility when the output pulses produced by head 11 are of relatively broad configuration owing to one or more of a combination of factors, for example, a low resolution of either or both of the "read" and "write" heads, extremely close pulse packing on the information channel, extremely high speed of the channel, etc.

Here, the clamped anode potential of triode 38 is applied through a diode to a common junction 97 within an "and" gating circuit 96. Timing signal *cl* is applied through another diode to junction 97 while junction 97 is connected through a relatively high valued resistor 98 to terminal $E_1$ and also to the $S_a$ input conductor of flip-flop A. In the same way, the clamped anode potential of triode 40 is applied to one input terminal of an "and" gating circuit 100, similar in all respects to circuit 96, while timing signal *cl* is applied to the other input terminal of circuit 100. The common junction of circuit 100 is connected to the $Z_a$ input conductor of flip-flop A.

Figure 4:
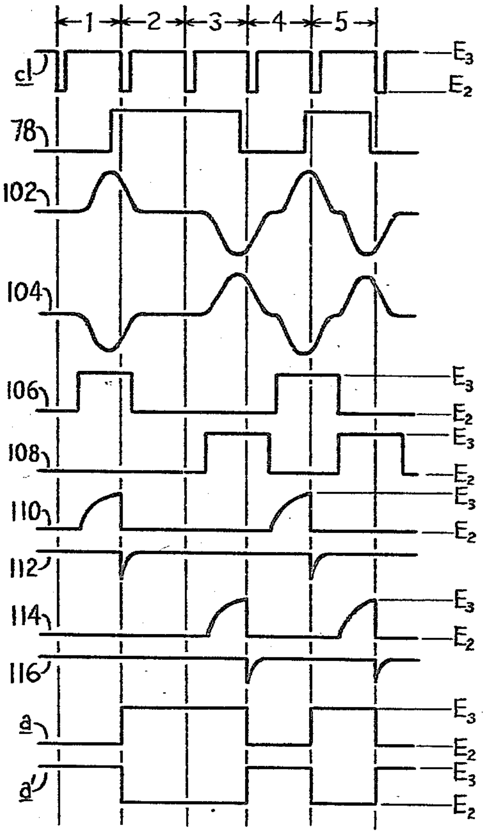
Figure 4 is a group of signal waveforms appearing at various points in the circuit of Figure 1 modified as suggested in Figure 3.

For explaining the manner of operation of the circuit of Figure 3, as included within the overall memory system of Figure 1, reference is now made to the group of signal waveforms within Figure 4. Again illustrated is timing signal *cl* and the magnetic bias representation 78, it here being displaced relative to signal *cl* such that its changes in bias direction take place slightly prior to the end of any given timing interval. The waveforms, generally designated 102 and 104, represent the potentials sensed by head windings 17 and 18 and applied to the grids of triodes 20 and 21, respectively, they being here relatively broad in duration in accordance with the preferred use of the Figure 3 circuitry. Next in Figure 4, are shown the signals 106 and 108 appearing at the anode of triodes 38 and 40, respectively, and corresponding to signals 84 and 86, respectively, in Figure 2. Here, as formerly, signals 106 and 108 contain only positive pulses which correspond to the positive pulses in signals 102 and 104, respectively.

Signals 106 and *cl* are applied concurrently to "and" circuit 96 and, owing to the direction of the diode connections therein, when both are positive, triggering capacitor 50 within flip-flop A will charge to that high voltage level from terminal $E_1$ through the relatively high valued resistor 98. Thus, during the first timing interval when signals 106 and *cl* are both high, capacitor 50 will charge up to the high level, as is illustrated in the waveshape, generally designated 110, of the signal appearing on common junction 97. Now, at the end of this first interval, when signal *cl* suddenly goes to its low voltage level, junction 97 will be likewise pulled to the low voltage level with capacitor 50 being concurrently discharged through its associated flip-flop grid resistor to thereby produce a negative pulse on the grid of triode 62 as is illustrated in the grid signal waveform, generally designated 112.

In the same way, the positive pulse or high voltage level in signal 108 appearing toward the end of the third timing interval acts, along with the normal high level in signal *cl*, to charge triggering capacitor 51 to the high voltage level as is illustrated in the signal waveform 114 appearing on the common junction of "and" circuit 100. Again, upon the switching of signal *cl* to its low voltage level at the beginning of the fourth interval, capacitor 51 is discharged through its associated grid resistor causing a negative pulse thereacross with the ensuing triggering of flip-flop A. The remaining portions of the signal waveforms in Figure 4 may be readily understood from the descriptions thus far presented.

As will be apparent to those skilled in the art, various modifications may be made in the circuitry of present invention without involving invention. For example, instead of using a blocking oscillator as the source of timing signals, a bistable flip-flop may be alternately triggered by the permanently recorded timing signal and consequently produce an output signal of square wave configuration. On the other hand, the timing signal may be generated by a so-called uni-stable or one-shot multivibrator in which case any desired degree of high to low voltage ratio during a timing interval may be obtained by proper adjustment thereof.

In addition, the number of amplifier stages shown here in the two amplifying channels is by way of example only and a greater or smaller number may be employed as determined by the strength of the magnetic recording on the recirculating information channel. Also, other types of recording circuits may be utilized, such circuitry having more or less gain, utilizing different voltages, etc. Finally, the voltages specifically given as appearing at the $E_1$, $E_2$, $E_3$ and $E_4$ terminals are by way of example only and, as will be appreciated by those skilled in the art, widely different potential magnitudes may be utilized by making only slight adjustments in the values of the various circuit components.

What is claimed is:

1. A device for converting binary digits represented by an initial electrical signal into a corresponding non-return to zero magnetic form on a moving magnetic channel, and reconverting the digits from magnetic form to a corresponding electrical signal similar to the initial electrical signal, said device comprising: means for converting the consecutive binary digit values in the initial electrical signal into corresponding consecutive magnetized cells on the moving magnetic channel, the magnetization of the cells representing one binary digit value being in one direction, the magnetization of the cells representing the other binary digit value being in the opposite direction, adjacent cells representing the same binary digit value being continuously magnetized in the same direction; first means responsive to alternate changes of direction of magnetization for producing first output signals when the direction of magnetization of adjacent cells changes from said one direction to said opposite direction; second means responsive to the remaining changes of direction of magnetization for producing second output signals when the direction of magnetization of adjacent cells changes from said opposite direction to said one direction; electrical switching means having a pair of input terminals and responsive to energy applied alternately thereto for producing output signals representing alternate binary digit values; means responsive to the first output signals for energizing said electrical switching means through one of its input terminals; and means responsive to the second output signals for energizing said switching means through its other input terminal.

2. A device for converting alternately directed magnetic flux alignments on a moveable magnetic memory channel into an equivalent electrical signal having corresponding alternate first and second voltage levels, said equivalent electrical signal being in synchronous relationship with a timing signal produced by a timing signal source, said timing signal including a series of consecutive, spaced low voltage levels, said device comprising: first and second reading means positioned adjacent the magnetic memory channel and responsive to changes of magnetic flux direction for producing two complementary output pulse trains, each of said trains including pulses of a first and second polarity; first and second amplifier means coupled to said first and second reading means, respectively, for amplifying the pulses in said pulse trains which are of said first polarity; an electronic switching device having first and second triggering capacitors and responsive to the discharge of said first and second capacitors for triggering into first and second conduction states, respectively, representing the first and second voltage levels, respectively; means for coupling the said first amplifier means and the timing signal source to said first triggering capacitor; and means for coupling said second amplifier means and the timing signal source to said second triggering capacitor whereby said first and second triggering capacitors are charged upon each appearance of an amplified pulse produced by said first and second amplifying means, respectively, and discharged by the next appearance of a low voltage level in the timing signal.

3. An apparatus for converting alternately directed magnetic flux alignments on a moving magnetic memory channel into an equivalent electrical signal having corresponding alternate first and second voltage levels, said equivalent electrical signal having a synchronous relationship with a timing signal including a series of spaced low voltage levels, said device comprising: first and second reading means positioned adjacent the magnetic memory channel and responsive to each change of magnetic flux direction for producing a pair of complementary output pulses, said complementary pulses being of first and second polarities, respectively, when the change in magnetic flux is of one sense, each of said pulses being of the opposite polarity when the change in magnetic flux direction is in the opposite sense; first and second amplifier means coupled to said first and second reading means, respectively, for amplifying the output pulses of said first polarity; an electronic switching device including first and second triggering capacitors and responsive to the discharge of said first and second capacitors for triggering into first and second conduction states, respectively, representing the first and second voltage levels, respectively; first and second electrical means for coupling said first and second amplifier means to said first and second triggering capacitors, respectively, whereby said first and second capacitors are charged by the appearance of the amplified pulses of said first polarity produced by said first and second amplifier means, respectively; and third and fourth electrical means for applying the timing signal to said first and second triggering capacitors, respectively, whereby each low voltage level therein acts to discharge either capacitor if charged.

4. The apparatus defined in claim 3 wherein each of said first, second, third and fourth electrical means comprises a uni-directional electron flow device.

5. The apparatus defined in claim 3 wherein said first and third, and said second and fourth electrical means form first and second "and" gating circuits, respectively.

6. A device for converting alternately directed magnetic flux alignments on a moving magnetic memory channel into an equivalent electrical signal having alternate first and second voltage levels, said equivalent signal having a synchronous relationship with a timing signal which in turn includes a series of alternate high and low voltage levels, said device comprising: a reading transducer positioned adjacent the magnetic memory channel, said transducer including a pair of windings and being responsive to changes in the magnetic flux direction for producing two complementary output pulse trains, said two pulse trains including pulses having first and second polarities, respectively, when the change in magnetization is of one sense, and pulses having second and first polarities, respectively, when the change in magnetization is of the opposite sense; first and second amplifier means respectively coupled to said pair of windings for amplifying the output pulses of said one polarity; an electronic switching device having first and second triggering capacitors and responsive to the discharge of said first and second capacitors for producing first and second output voltage levels, respectively; means for applying the amplified output pulses produced by said first and second amplifier means to said first and second triggering capacitors, respectively, to charge said capacitors; and means for applying the timing signal to said first and second triggering capacitors whereby the low voltage level therein acts to discharge either capacitor if charged.

7. An apparatus for recording an input electrical signal having alternate first and second voltage levels representing first and second binary digit values, respectively, on a moving magnetic memory channel as a non-return to zero magnetic flux pattern, and for converting the resulting magnetic pattern back into the original electrical signal form, said device comprising: means for normally magnetically biasing the magnetic memory channel in one direction to represent a series of binary digits having the first binary digit value; magnetic writing means positioned adjacent the channel and responsive to each appearance of the second voltage level in the input electrical signal for changing the direction of bias normally applied by the first-named means to represent the second binary digit value; magnetic reading means positioned adjacent the channel, said reading means having first and second output terminals for producing first and second polarity pulses on said first and second output terminals, respectively, when the channel pattern changes from said first to said second direction of bias, and second and first polarity pulses on said first and second output terminals, respectively, when the channel pattern changes from said second to said first direction of bias; first and second amplifier channels coupled to said first and second output terminals, respectively, for amplifying pulses of said first polarity; a bistable electronic switching device having first and second input conductors, said switching device being responsive to the application to said first and second input conductors of pulses having said first polarity for triggering into first and second conduction states, respectively; and means for applying the amplified pulses from said first and second amplifier channels to the first and second input conductors, respectively, of said electronic switching device whereby the series into which conduction states of said switching device is triggered correspond to the first and second voltage levels of the input electrical signal.

8. The apparatus defined in claim 7 wherein the last named means comprises first and second uni-directional electron flow devices, coupled to said first and second input conductors respectively.

9. The apparatus defined in claim 7 wherein the last named means comprises first and second gating circuits coupled to said first and second input conductors, respectively.

10. An apparatus for converting a non-return-to-zero binary flux pattern on a moving magnetic memory channel into an equivalent electrical signal, said device comprising: means for converting the changes in flux pattern into first and second streams of complementary pulses; means for eliminating all pulses of a predetermined polarity appearing in the pulse streams whereby the remaining pulses appear alternately in said first and second pulse streams; switching means responsive to first and second input signals for producing first and second output signals, respectively; and means for applying the remaining pulses in said first and second pulse streams as first and second input signals, respectively, to said switching means whereby the alternate first and second output signals produced by said switching means represent the flux pattern on the moving magnetic memory channel.

11. The apparatus defined in claim 10 wherein the last-named means includes a plurality of uni-directional electron flow devices.

12. The apparatus defined in claim 10 wherein the last-named means includes first and second "and" gating circuits for applying said first and second pulse streams as first and second input signals, respectively, to said switching means.

References Cited in the file of this patent

UNITED STATES PATENTS

| | | |
|---|---|---|
| 2,609,143 | Stibitz | Sept. 2, 1952 |
| 2,675,427 | Newby | Apr. 13, 1954 |